Figure 1:
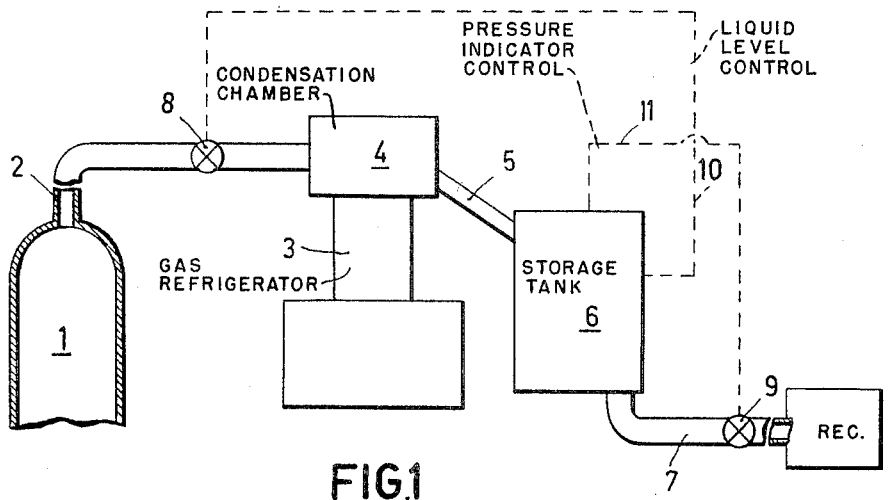

INVENTOR.
JOHANNES. R. VAN GEUNS
BY
AGENT

United States Patent Office 3,282,061
Patented Nov. 1, 1966

3,282,061
GAS LIQUEFIER PLANT WITH LOW
PRESSURE STORAGE
Johannes Rudolphus van Geuns, Emmasingel, Eindhoven,
Netherlands, assignor to North American Philips Company, Inc., New York, N.Y., a corporation of Delaware
Filed Jan. 31, 1964, Ser. No. 341,696
Claims priority, application Netherlands, Feb. 4, 1963,
288,549
3 Claims. (Cl. 62—37)

The invention relates to a method of liquefying a gas, for example hydrogen, and to a plant for performing the said method.

In a known method of the present type, a gas under pressure is supplied to a chamber which is cooled at the condensation temperature of the gas in question associated with that pressure. This chamber is preferably cooled by means of a gas refrigerator. The gas is condensed in that chamber after which this condensed gas is conducted away.

A drawback of this known method, in which gas is continuously condensed and conducted away, is that during the exhausting procedure, the liquefied gas must be expanded from the pressure at which condensation takes place to atmospheric pressure through an expansion valve. In this case, a large part of the liquid volatilizes which adversely influences the production. The percentage of volatilized liquid may sometimes be as high as 40%, for example in the case of hydrogen gas which is liquefied under a pressure of 8 atm.

In known plants the volatilized liquid is conducted through a heat exchanger where it is heated again to room temperature in countercurrent with the gas to be condensed. This results in an improvement of the yield with respect to the above method but it has the disadvantage that a heat exchanger is required which, is general, is complicated and expensive.

A further drawback of this known type of plant is that the gas to be condensed must have a high purity since otherwise the channels in the heat exchanger which in general are narrow and the expansion valve may be blocked by the impurities.

It is an object of the present invention to avoid the above complicated heat exchanger and the expansion valve while maintaining the favourable condition of liquefying under enhanced pressure, which, consequently, can take place at higher temperatures, at which temperatures the required cold can in general be produced more advantageously.

The method according to the invention is characterized in that at first a quantity of gas under pressure is condensed, after which by continued condensing in a chamber cut off from the gas supply the pressure of the liquefied gas is decreased, the outlet of the liquefied gas from that chamber being opened only when the pressure in that chamber is substantially equal to the pressure in the storage container.

It is possible to liquefy gases and gas mixtures in accordance with the teachings of the present method, such as air, oxygen, nitrogen, hydrogen, helium and so on, with a better yield than was obtained in the past.

A plant suitable for performing the method according to the invention which comprises at least one refrigerator of which the cold part is provided in a condensation chamber, to which chamber an inlet pipe for gas under pressure and an outlet pipe for liquefied gas is connected, a storage container possibly being included in this outlet pipe, is characterized in that controllable cocks and located in the inlet and outlet pipes. The plant further comprises a control device which, when the cock in the outlet pipe is closed, keeps the cock in the inlet pipe opened for a definite period of time or until a definite quantity of liquefied gas is available in the plant, after which the control device closes the cock in the gas inlet pipe after which the refrigerator, by continued cooling, decreases the pressure of the liquefied gas. The control device opens the cock in the outlet pipe for liquefied gas when the pressure is substantially equal to the pressure in the storage container.

Although the condensation of the gas under pressure in this plant takes place intermittently, it has surprisingly been found that the production is increased per unit of time.

A favourable embodiment of the plant according to the invention is characterized in that it comprises at least two cooled condensation chambers which can be connected alternately to the same inlet pipe for gas under pressure and each comprises an outlet for liquefied gas. So in this plant alternately in one of the two condensation chambers gas is condensed under pressure, while in the other chamber the continued cooling followed by the conducting away of the liquefied gas takes place.

A further embodiment of the plant suitable for performing the method according to the invention, which plant comprises a refrigerator in which the cold part is provided in a condensation chamber to which an inlet pipe for gas under pressure and an outlet pipe for liquefied gas is connected, a storage tank possibly being included in the outlet pipe, is characterized in that this plant comprises two containers in each of which the cold part of a further refrigerator is provided, the two containers are connected alternately, through pipes, to the cooled condensation chamber, each of the containers being provided with an outlet pipe for liquefied gas which pipes are each provided with a controllable cock. The plant further comprises a control device which, after a given period of time or after the liquid in one of the containers has reached a certain level, closes the container in question from the condensation chamber and connects the other container therewith. The control device, after continued cooling in the container in question, opens the cock in the liquid outlet pipe in question only when the pressure in the container in question is substantially equal to the pressure in the storage container.

In a favourable embodiment of the plant according to the invention, each of the refrigerators is formed by a gas refrigerator which automatically adapts, during the continued cooling, to the decreasing temperature and pressure of the liquefied gas.

If no gas refrigerator is used as refrigerator, a separate device must be provided in the plant which adapts the temperature at which the refrigerator supplies its cold during the continued cooling, to the temperature and pressure of the gas in the chamber in question. The great advantage of the gas refrigerator is that it automatically adapts its temperature at which it supplies the cold to the circumstances.

In order that the invention may readily be carried into effect, a few examples of plants for liquefying a gas will now be described more fully, by way of example, with reference to the accompanying drawing, in which, FIG. 1 diagrammatically shows a plant for liquefying a gas, the plant comprising one condensation chamber.

Figure 2:
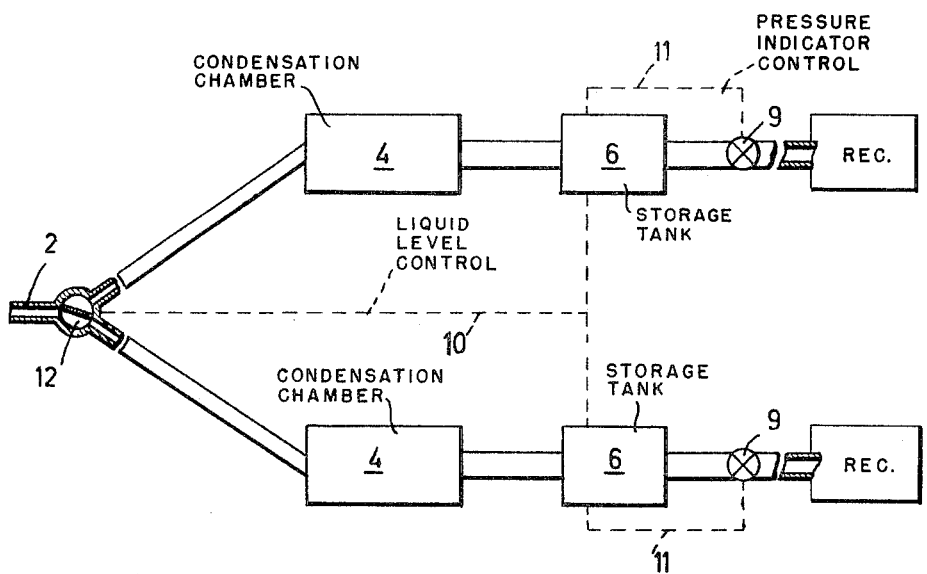

FIG. 2 diagrammatically shows a plant which comprises two plants shown in FIG. 1 which can alternately be connected to the same inlet pipe for gas under pressure.

Figure 3:
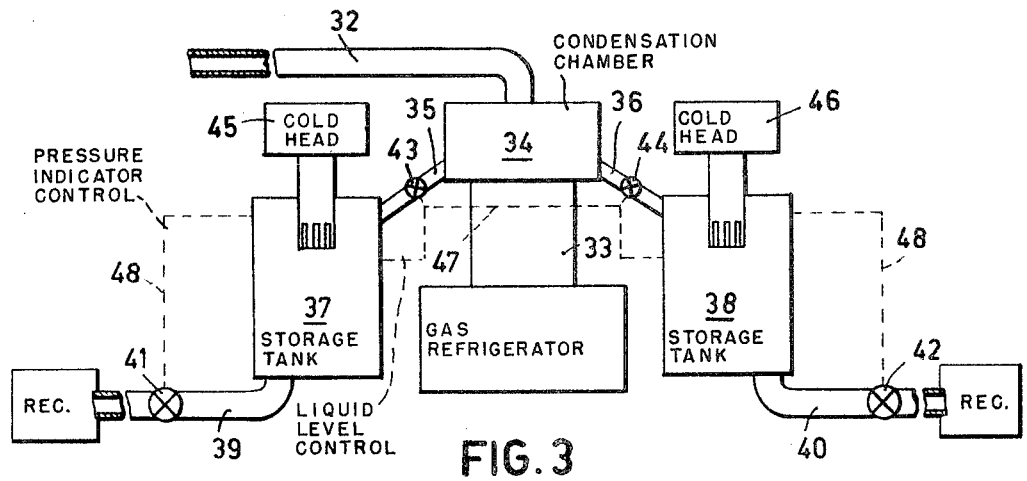
Figure 4:
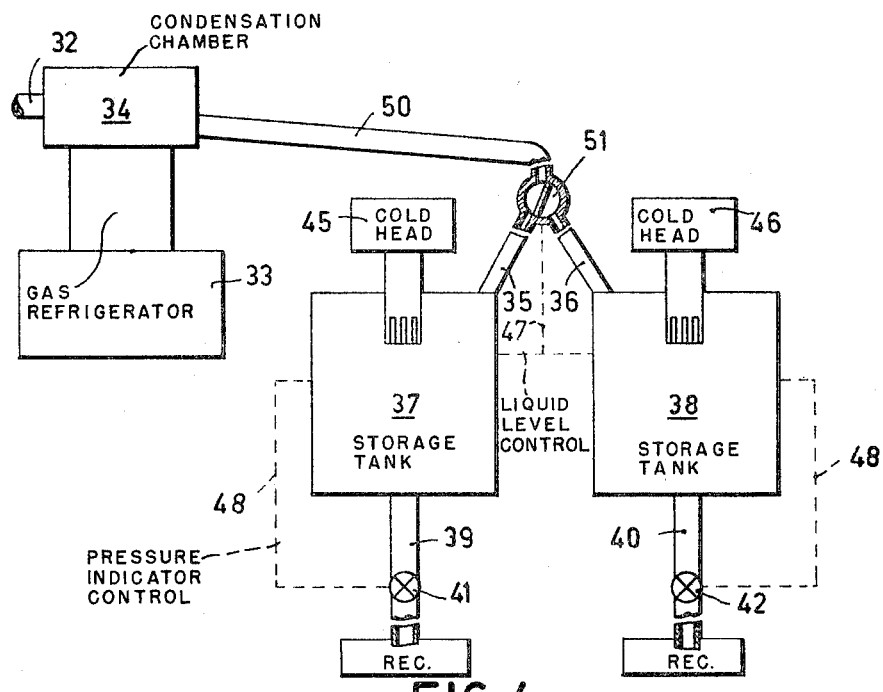

FIGS. 3 and 4 diagrammatically show two embodiments of a plant for liquefying a gas, this plant comprising two liquid containers which can alternately be connected to a space in which gas under pressure is condensed.

The plant shown in FIG. 1 comprises a container 1 in which a gas, for example hydrogen gas, is available under pressure of, for example, 8 atm. To the container 1 is connected a pipe 2 which is connected with its other end to the condensation chamber 4 around the cold head of a gas refrigerator 3. The condensation chamber 4 is in open connection, through a pipe 5, with a storage container 6 to which a liquid outlet pipe 7 is connected. A controllable cock 8 is available in the gas inlet pipe 2 and a controllable cock 9 is provided in the gas outlet pipe 7. A liquid level indicator, not shown, is provided in the storage container 6 which indicator, through a control device which is indicated diagrammatically in the drawing by a broken line 10, can determine the position of the cock 8. The storage container 6 further comprises a pressure indicator, not shown, which, through a control device which is indicated in the drawing by a broken line 11, determines the position of the cock 9.

The operation of the device is as follows: Initially the cock 9 is closed and the cock 8 is opened, gas flowing from the container 1 to the condensation chamber 4 and condensing there on the cold head of the gas refrigerator. The condensed gas can flow through the pipe 5 into the storage container 6. When the liquid in the storage container 6 has reached a prescribed level indicated by the liquid indicator, the cock 8 is closed by the control device 10. The refrigerator 3 continues cooling the vapour available in the condensation chamber 4, the pressure and the temperature in the chamber 4 and consequently in the storage container 6 decreasing. When the pressure indicator provided in the container 6 measures a pressure which corresponds to atmospheric pressure or to the pressure in the storage container, the cock 9 is opened by the control device and the liquid can be conducted away out of the storage container without expanding. When the liquid in the container 6 has fallen below a given level, the cock 9 is closed again and the cock 8 is opened.

Although a plant is described hereinabove in which the position of the cocks 8 and 9 is determined in accordance with the liquid level and the pressure in the storage container, it is also possible to have a plant which is controlled in accordance with time.

The operation of the device in this case may be as follows: For condensing hydrogen, the hydrogen is supplied under a pressure of 8 atm. to the condensation chamber 4 for 20 minutes. After these 20 minutes the cock 8 is closed. The refrigerator 3 then cools for 3 minutes the vapour in the condensation chamber 4, the pressure consequently falling again. Then the cock 9 is opened and the liquid conducted away.

It has appeared that in this manner an increase in production of approximately 50% is obtained with respect to the method in which hydrogen is condensed continuously under a pressure of 8 atm., after which this condensed hydrogen is expanded to atmospheric pressure.

Although in the drawing the gas under pressure is supplied from a storage container 1, for example a gas cylinder, the gas under pressure may also be supplied by by means of a compressor.

FIG. 2 diagrammatically shows how it is possible to alternately couple two plants according to FIG. 1 to the same inlet pipe 2 for gas under pressure. For this purpose a three-way-cock 12 is used. The operation of each of the two plants corresponds to that of the plant shown in FIG. 1, that is to say that on reaching a given liquid level in one of the containers 6 the three-way-cock 12 is now switched over.

FIG. 3 shows another embodiment of a plant for liquefying a gas. In this plant, 32 is an inlet pipe for gas under pressure which is connected to the condensation chamber 34 which is provided around the head of a gas refrigerator 33. To the condensation chamber 34 are connected two liquid outlet pipes 35 and 36 which open into the containers 37 and 38 with their other ends. To these containers are connected liquid outlet pipes 39 and 40 which are provided with controllable cocks 41 and 42. Likewise controllable cocks 43 and 44 are provided in the pipes 35 and 36. In each of the containers 37 and 38 the cold head of a gas refrigerator 45 and 46 respectively is provided.

The operation of the device is as follows. At the beginning of the operation of the plant the cocks 41 and 42 are closed and one of the cocks 43 and 44 is opened. If it is assumed that the cock 43 is opened, the liquid which condenses in the chamber 34 will flow to the container 37 through the pipe 35. Since the chamber 34 and the container 37 are in open connection with one another, the high-pressure gas can also reach the head of the refrigerator 45 on which also a part of this gas is condensed. When the liquid in the container 37 has reached a certain level, a control device which is indicated by broken lines 47 ensures that the cock 43 is closed and the cock 44 is opened.

The refrigerator 45 further cools the vapour in the container 37 above the liquid. As a result of this, the pressure and the temperature in this container decrease. When the pressure in the container is substantially equal to the ambient pressure, the control device diagrammatically indicated by broken lines 48 opens the cock 41 so that the liquefied gas can leave the container 37 through the outlet pipe 39. Meanwhile, a quantity of liquid has collected in the container 38. When reaching a given liquid level in that container, the cock 44 is closed and the cock 43 is again opened. In this manner gas under high pressure is continuously condensed, the liquid being drained off only when the pressure is sufficiently low.

Another embodiment of the above plant is shown in FIG. 4. In this case only one pipe 50 is connected to the condensation chamber 34 which pipe can be connected to the open pipes 35 and 36 through a three-way-cock 51. The operation of this device corresponds completely to that shown in FIG. 3.

For clearness' sake a storage container 6, 37 and 38 is always drawn between the outlet from the condensation chamber around the cold head of the refrigerator and the outlet cock 9, 41, 42. It will be clear that if desired, the condensation chamber may be constructed so that the liquid formed during condensing under high pressure may be stored in it. This results in a device which constructively is simpler but further does not change the principal idea of the invention.

Although in the drawing gas refrigerators are shown as refrigerators, it will be clear that instead of these possibly also other refrigerators may be used. The advantage of the gas refrigerator, however, is that these machines produce their cold at temperatures which automatically adapt to the circumstances, so that during the continued cooling the refrigerator suplies its cold at ever decreasing temperatures. This renders a control of the refrigerator in this case superfluous.

The method and device according to the invention are particularly suitable for liquefying gases with a low boiling point, for example, hydrogen, helium, neon and so on.

What is claimed is:

1. A gas liquefying plant comprising a gas supply under pressure, a refrigerator having a condensation chamber, a supply pipe connecting said gas supply to the condensation chamber of said refrigerator, the cold part of said refrigerator being in said condensation chamber, a storage container for said liquefied gas in open connection with the condensation chamber of said refrigerator, an inlet pipe for conducting condensed liquid from the condensation chamber to the storage container, an outlet pipe for said storage container, said condensation chamber being connected to said inlet pipe, a valve in both said supply and outlet pipes, a first control device operative after the liquid in said storage container has reached a given level to close the valve in said supply pipe and thereby close off the associated storage container, and a second control device which after cooling of the storage container opens the valve in said outlet pipe when the pressure in the storage container is substantially equal to a predetermined pressure.

2. A gas liquefying plant comprising a gas supply under pressure, a refrigerator having a condensation chamber, the cold part of said refrigerator being in said condensation chamber, storage containers for the liquefied gas from the condensation chamber, inlet pipes for conducting condensed liquid from the condensation chamber to the storage containers, an outlet pipe for each of said storage containers, said condensation chamber being connected to said inlet pipes, valves in said inlet and outlet pipes, a first control device operative after the liquid in one of said storage containers has reached a given level to close the valve in one of said inlet pipes and to maintain open the valve in the other inlet pipe to thereby close off the associated storage container, and a second control device which after cooling of the associated storage container opens the valve in the associated outlet pipe when the pressure in the associated storage container is substantially equal to a predetermined pressure.

3. A gas liquefying plant as claimed in claim 1 wherein said refrigerator is a cold gas refrigerator which during the continued cooling of the plant automatically adapts to the decreasing temperature and pressure of the liquefied gas.

References Cited by the Examiner

UNITED STATES PATENTS

| 2,782,141 | 1/1957 | King. | |
| 2,951,346 | 9/1960 | Collins | 62—40 X |
| 3,210,952 | 10/1965 | Strom | 62—40 |

OTHER REFERENCES

Kohler: The Gas Refrigerating Machine and its Position in Cryogenics Technique, Progress in Cryogenics, vol. 2, page 60.

Schaffers: Design and Application of a Gas Liquefier, Advances in Cryogenic Engineering, volume 3, pages 92–98.

NORMAN YUDKOFF, *Primary Examiner.*

ROBERT F. BURNETT, *Examiner.*

V. W. PRETKA, J. C. JOHNSON, *Assistant Examiners.*